(No Model.)
J. C. PENNINGTON.
STERILIZING FRUIT JUICES.
No. 596,909. Patented Jan. 4, 1898.
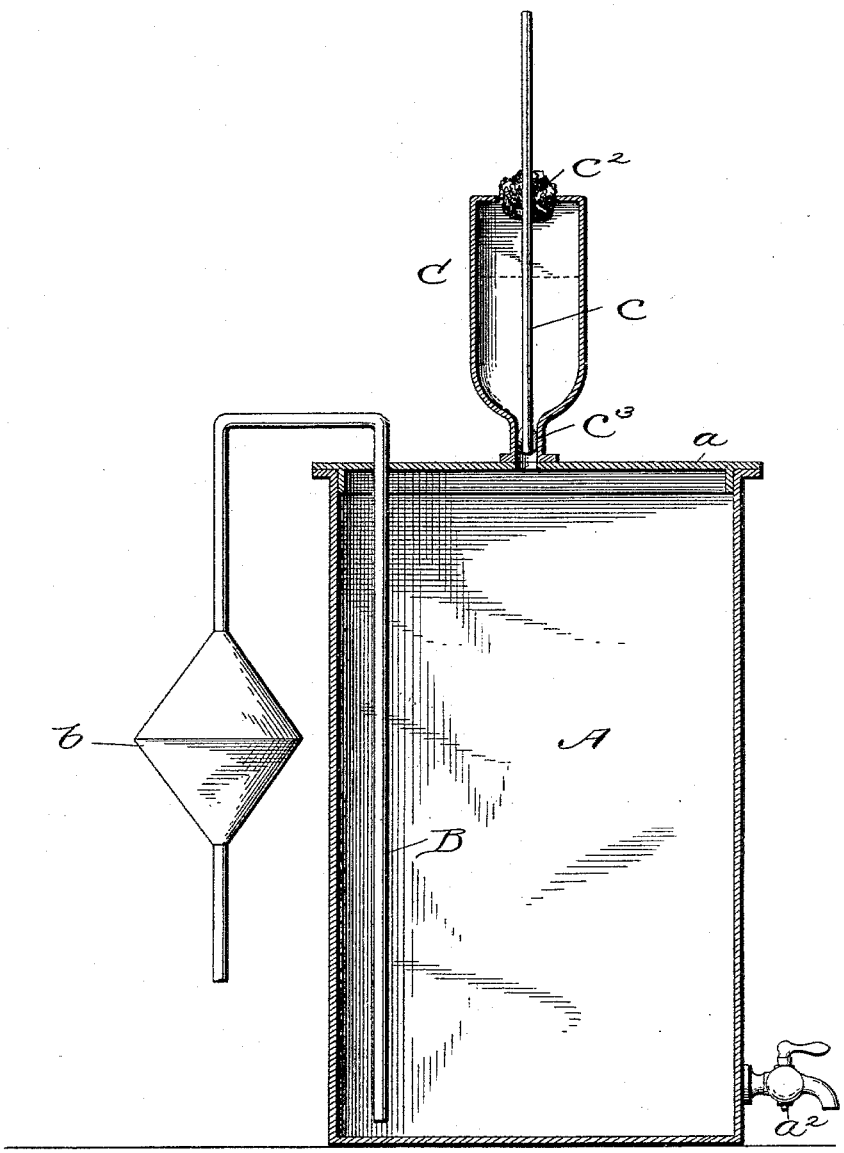
Witnesses:
Inventor:
John C. Pennington,
by his attorney.

UNITED STATES PATENT OFFICE.

JOHN C. PENNINGTON, OF PATERSON, NEW JERSEY.

STERILIZING FRUIT-JUICES.

SPECIFICATION forming part of Letters Patent No. 596,909, dated January 4, 1898.

Application filed March 23, 1897. Serial No. 628,915. (No specimens.)

*To all whom it may concern:*

Be it known that I, JOHN C. PENNINGTON, a citizen of the United States, residing at Paterson, in the county of Passaic and State of New Jersey, have invented certain new and useful Improvements in Sterilizing Fruit-Juices; and I do hereby declare the following to be a full, clear, and exact description of the invention, such as will enable others skilled in the art to which it appertains to make and use the same.

This invention relates to sterilizing fruit-juices, &c.

The object is to sterilize fruit-juices without the employment of heat and to present sterilized fruit-juices which will keep indefinitely without the presence of an antiseptic or other extraneous matter—that is, pure, unfermentable, and unfermented fruit-juices; furthermore, to prepare such juices for fermentation by pure ferments; and, furthermore, to arrest fermentation when it has reached the proper or predetermined point, as in certain kinds of wines, &c.

In carrying my invention into effect I add to the juice sulfurous acid in solution or sulfurous anhydrid in the form of a gas or liquefied in quantity varied according to the facility or difficulty of sterilizing it and also according to surrounding circumstances. For instance, for a rather acid grape-juice I have found that one ounce of sulfurous anhydrid is sufficient thoroughly to sterilize and keep indefinitely forty gallons of the juice, and I have found by many experiments that this quantity of the sterilizing agent does not injure the flavor or aroma of the juice and that the same may be kept in this condition for many months without injury or deterioration. In practice I prefer to let the juice so treated stand for at least a week in order that it may settle clear and also that all ferments, bacteria, and germs may be killed by the action of the sulfurous acid. This operation may be performed in an ordinary wooden cask or tun closed from the dust of the air, and the juice may be filtered, if necessary. After having been subjected to the action of the sulfurous acid for the proper or requisite time I run the juice into a receptacle which, by preference, should be made of iron enameled, add a small quantity of pure sulfuric acid to the juice—say, one-fourth of an ounce—and leave it for a few days. A quantity of pure hydrated binoxid of barium, by preference exactly equivalent to the sulfurous acid in the liquid, is put into a suitable apparatus, stirred up or agitated with water containing a small quantity of pure sulfuric acid, and the whole is left to stand for at least a day in order that the binoxid of hydrogen produced by the action of the dilute acid on the binoxid of barium may have time to destroy any germs that may have gotten into the apparatus while charging it. The wet binoxid of barium, the binoxid of hydrogen, and the sulfate of baryta produced by the dilute sulfuric acid is now run or forced into the juice while it is being stirred up by blowing sterilized air into it, or it may be kept in a state of agitation by mechanical means. The sulfurous acid in the juice is quickly oxidized to sulfuric acid, which combines with the barium oxid of the barium binoxid and is precipitated as practically insoluble sulfate of baryta.

Among the many ways of determining how much of the wet binoxid of barium is necessary to oxidize all the sulfurous acid in the juice the following is one which may be adopted: a small quantity of the wet binoxid is weighed out, and to this is added from a graduated burette some of the fruit-juice containing the sulfurous acid until the sulfurous acid is in slight excess. This may be known by dotting a white plate with some drops of starch solution, to which a drop of very dilute solution of iodin has been added so as to blue it. When enough of the fruit-juice has been added to the binoxid to neutralize it, a drop of the juice in excess will bleach the blue of the iodid of starch. From these data the quantity of binoxid of barium necessary may be readily calculated.

For example, suppose one gram of the wet binoxid of barium was taken and it required four hundred cubic centimeters of the grape-juice for neutralization, then for forty gallons, or, say, one hundred and fifty liters, it would require three hundred and seventy-five grams of the wet binoxid.

The fruit-juice should be allowed to stand for a few days, so that the sulfate of baryta formed may precipitate, and it should then be examined to see if all the sulfurous acid has been oxidized and precipitated. To determine this I prefer to use two methods. By the first method I put a small quantity of the juice into a test-tube, together with a drop of sulfuric acid and connect the test-tube by a cork and tube bent twice at right angles to another tube containing a little cold water. I then boil the juice and catch any sulfurous acid that may be in it in the second test-tube. I then put a drop of this water on a watch-glass and touch it with a drop of nitrate of silver. If any sulfurous acid remains in the juice it will make a white precipitate. The second method is to put a small quantity of starch solution in two small capsules and add to one of them a little of the juice. I then add to both a drop of very dilute solution of iodin, shake both of the capsules, and observe them a minute. If any sulfurous acid remains in the juice the blue color produced by the iodin on the starch will quickly disappear. The distillate of the previous experiment may be tested in the same manner. If any sulfurous acid is found remaining in the juice, more binoxid of barium must be added, as before described. An aliquot part of the juice should now be tested in the ordinary manner for sulfuric acid, and the proper quantity of a pure solution of caustic baryta thus indicated should be added by suitable means. The caustic baryta may be made by taking ordinary "blanc fixe," (sulfate of baryta,) mixing with it, by grinding, one-half its weight of soft coal, then heating the mass to a white heat in a black-lead crucible or in a properly-made reverberatory furnace, which procedure produces sulfid of barium, and leaching this out by boiling water, whereupon the solution of barium sulfid is allowed to settle clear and, to take the sulfur from the barium, is then boiled with copper oxid, made by roasting copper turnings, &c., and added little by little until paper wet with acetate of lead will no longer be blackened, the solution being then allowed to cool, whereupon the baryta crystallizes out and is then recrystallized. I prefer to leave a minute excess of sulfuric acid in the juice beyond what combines with the barium oxid, so that a drop of sulfuric acid will leave it clear and a drop of barium chlorid will cloud it. This insures that no salts of baryta remain in the juice. While the sulfuric acid will be free so far as the barium oxid is concerned, it soon combines to sulfate of potash, as all fruit-juices contain organic salts of potash, such as malate, tartrate, citrate, &c. The excess of sulfuric acid setting free some of these organic acids forms sulfates of their bases. There is really no free mineral acid left in the finished product.

To make the very pure hydrated binoxid of barium required in this process, I take the binoxid of sodium now generally supplied to the trade and stir it gradually into very cold water—say, fifty parts by weight of the binoxid to one thousand parts of the water. I now make a solution of one hundred and fifty parts of chlorid of barium in, say, one thousand of water and mix the two solutions. The pure hydrated binoxid or barium now precipitates in small scales and is insoluble, may be well washed, and is then very pure. After the juice has been treated in this manner it has all the color, flavor, and aroma it had when first expressed and will keep indefinitely on condition that it is not allowed to come in contact with the dust of the air. The aroma and flavor have not been spoiled by heating, and no addition of sugar or antiseptic is necessary. It is now fit to be fermented by addition of pure ferments, or it may be bottled for use in any manner that is efficient for keeping spores of ferments, bacteria, &c., out of it.

It will be seen that the practicability of this process of sterilizing juice depends, first, on the fact that the sulfurous acid destroys and kills permanently all ferments, germs, and spores; second, that it does not injure the flavor, aroma, or color of the juice; third, that a solution of binoxid of hydrogen also kills germs and spores; fourth, that the solution of binoxid of hydrogen containing binoxid of barium can be introduced into the juice containing the sulfurous acid, thereby oxidizing it to sulfuric acid and precipitating it as sulfate of baryta without introducing any ferments or spores; fifth, that binoxid of barium can be easily and cheaply made perfectly pure; sixth, that caustic baryta, on account of its easy crystallization, can be made perfectly pure, and, seventh, that sulfate of baryta produced by the reaction is almost absolutely insoluble, and therefore that the sterilized juice is free from any extraneous substance.

A form of apparatus capable of carrying my invention into effect I have shown in the accompanying drawing, in which the figure is a sectional elevation displaying a receptacle, preferably of enameled iron, an air-pipe discharging into the same and provided with an air-filter, and the funnel to contain binoxid of barium, with means for forcing the same into the juice contained in the receptacle.

Referring to the drawing, A designates a receptacle which, as before stated, is preferably of enameled iron. This receptacle is provided with a removable top $a$, which when in place hermetically seals the receptacle, and with a cock $a^2$, by which the contents of the receptacle may be drawn off. In this receptacle, in this instance from the top, is a pipe B, which extends nearly to the bottom of the same and is bent in any suitable shape, as in this instance in the shape of a siphon, and has connected with it exteriorly of the receptacle an air-filter $b$, containing sterilized cotton or the like, the other end of the pipe B leading from this filter being connected with a suitable air-receptacle containing air under pressure or other means for forcing the air by temperature-pressure into the receptacle. Mounted upon the top of the casing is a funnel C, in which is mounted a piston in the nature of a glass stick c, which works at its upper end through an opening in the top of the funnel, a cotton plug $c^2$ being fitted around the stick where it works in the opening for the purpose of excluding germs, microbes, and the like. The lower end of this stick or piston carries a piston-head $c^3$, which works in the neck of the funnel and is adapted to force the binoxid of barium contained in the funnel into the receptacle. As before stated, after the juice has been placed in this receptacle a small quantity of pure sulfuric acid is added to the juice and is thoroughly stirred up and incorporated in it by means of the blast of air through the pipe B. When the binoxid of barium is to be forced into the juice, it is first placed in the funnel and acidulated with a little sulfuric acid. It is then left in the funnel for at least a day in order that all germs will be destroyed by the action of the hydrogen binoxid set free by the acid. It is then forced into the juice in the manner before stated.

After the juice is thoroughly sterilized it may be bottled by the process and apparatus described in my patent dated December 22, 1896, No. 573,592, and in bottles sterilized by the process described in my patent dated April 28, 1896, No. 559,203.

Having thus fully described my invention, what I claim as new, and desire to secure by Letters Patent of the United States, is—

1. The herein-described process of sterilizing fruit-juices, which consists in charging the juice with sulfurous acid, then leaving it to settle, then oxidizing the sulfurous acid to sulfuric acid, and precipitating the oxidized substance, substantially as described.

2. The herein-described process of sterilizing fruit-juices, which consists in charging the juice with sulfurous acid, leaving it to settle, so as to destroy microbes, germs, spores, &c., then oxidizing the sulfurous acid to sulfuric acid, and then precipitating the sulfuric acid with baryta, substantially as described.

In testimony whereof I affix my signature in presence of two witnesses.

JOHN C. PENNINGTON.

Witnesses:
JOHN R. BEAM,
C. FRANK KIREKER.